(12) United States Patent
Wigant

(10) Patent No.: US 12,497,942 B2
(45) Date of Patent: Dec. 16, 2025

(54) SYSTEM FOR CONVERTING KINETIC POWER TO HYDRAULIC POWER USING A MEMBRANE AND A FIRST LIQUID ON A PRIMARY SIDE OF THE MEMBRANE AND A SECOND LIQUID ON A SECONDARY SIDE OF THE MEMBRANE

(71) Applicant: PATENTSELSKABET AF 30. NOVEMBER 2014 APS, Esbjerg (DK)

(72) Inventor: Lars Wigant, Esbjerg (DK)

(73) Assignee: PATENTSELSKABET AF 30. NOVEMBER 2014 APS, Esbjerg (DK)

( * ) Notice: Subject to any disclaimer, the term of this patent is extended or adjusted under 35 U.S.C. 154(b) by 0 days.

(21) Appl. No.: 18/840,144

(22) PCT Filed: Jan. 24, 2023

(86) PCT No.: PCT/EP2023/051622
§ 371 (c)(1),
(2) Date: Aug. 21, 2024

(87) PCT Pub. No.: WO2023/160926
PCT Pub. Date: Aug. 31, 2023

(65) Prior Publication Data
US 2025/0172120 A1   May 29, 2025

(30) Foreign Application Priority Data
Feb. 24, 2022   (EP) .................................... 22158431

(51) Int. Cl.
*F03B 13/22*   (2006.01)
(52) U.S. Cl.
CPC .................................... *F03B 13/22* (2013.01)
(58) Field of Classification Search
CPC ........... F03B 13/12; F03B 13/22; Y02E 10/30
See application file for complete search history.

(56) References Cited

U.S. PATENT DOCUMENTS

2005/0016924 A1   1/2005   Devoe
2021/0031143 A1*  2/2021   Simmons, II ........ B01D 61/025

FOREIGN PATENT DOCUMENTS

CN   109139343 A  *  1/2019
EP   1 756 419 A1    2/2007
(Continued)

OTHER PUBLICATIONS

International Search Report for PCT/EP2023/051622 mailed Mar. 24, 2023.
Written Opinion for PCT/EP2023/051622 mailed Mar. 24, 2023.

*Primary Examiner* — Abiy Teka
(74) *Attorney, Agent, or Firm* — Schmeiser, Olsen & Watts, LLP

(57) ABSTRACT

A system for converting kinetic energy to hydraulic energy is provided, the system including—a piston housing and a piston, the piston includes a shaft extending outside a piston housing for activation of the piston, and the piston divides the piston housing into a first and second chamber, and—a first pressure tank and/or a second pressure tank, where the first and/or second pressure tanks include a flexible membrane separating the first and/or second pressure tank into a primary and secondary side, wherein the first chamber and/or second chamber are hydraulically connected, respectively, to the primary side of the first and/or second pressure tank, the secondary side of the first pressure tank and/or the second pressure tank being in liquid connection to an inlet valve and an outlet valve, the system further includes—a first liquid on the primary side and a different secondary liquid on the secondary side.

16 Claims, 4 Drawing Sheets

(56) References Cited

FOREIGN PATENT DOCUMENTS

| | | |
|---|---|---|
| EP | 2864628 A1 | 4/2015 |
| FR | 2 983 922 A1 | 6/2013 |
| WO | 2013/189500 A1 | 12/2013 |

\* cited by examiner

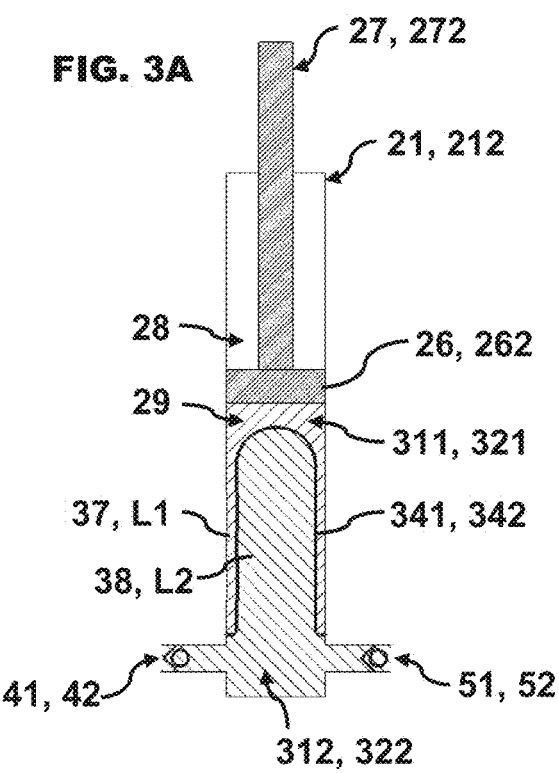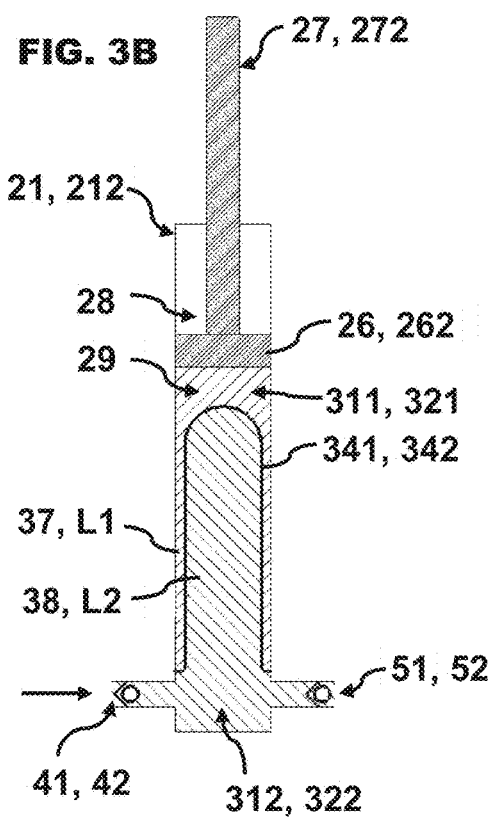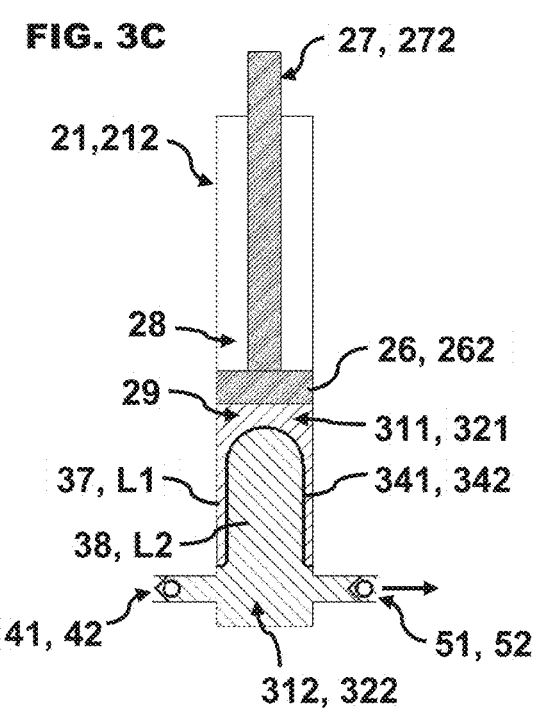

SYSTEM FOR CONVERTING KINETIC POWER TO HYDRAULIC POWER USING A MEMBRANE AND A FIRST LIQUID ON A PRIMARY SIDE OF THE MEMBRANE AND A SECOND LIQUID ON A SECONDARY SIDE OF THE MEMBRANE

CROSS-REFERENCE TO RELATED APPLICATIONS

This application is a national stage of PCT Application No. PCT/EP2023/051622, having a filing date of Jan. 24, 2023, which is based EP Application No. 22158431.1, having a filing date of Feb. 24, 2022, the entire contents both of which are hereby incorporated by reference.

FIELD OF TECHNOLOGY

The following relates to a system for converting kinetic power to hydraulic power, wherein a membrane divides the system into a primary side and a secondary side, wherein seawater is used as a secondary liquid on the secondary side and different first liquid is used on the primary side, which primary side include a piston housing with a piston such that the wear on the piston housing and the piston is reduced relative to only using seawater or water or fresh water or groundwater or treated water or hydraulic oil.

BACKGROUND

It is a well-known problem that seawater will wear down most metal constructions over time. In particular a problem for wave power systems as the systems are in direct contact with seawater.

The wear may in part be from the salt in the seawater and/or due to particles in the seawater.

Furthermore, the wave power systems must have some subsystems for converting a wave generated movement to power. There are several solutions, such as waves causing linear movement of a piston with the linear movement then being converted to hydraulic power.

Here seawater could be used as the hydraulic liquid as it is readily available. However, the wear rate on the piston and piston housing is great due to salt and particles in the seawater. Thus, there is a need for a different solution reducing the wear rate and prolonging the lifetime of the piston and piston housing.

Seawater includes particles unless the seawater is filtered to a great extent. This will cause the seawater to have a high wear rate on a water turbine which will have components moving at high velocities. The particles will collide with the moving components at high relative speeds and the components will thus be worn over time. The sea water is better used in a reverse osmosis plant. In embodiments, if the system is connected to a water turbine it would then be desirable if the hydraulic liquid could be water such as fresh water or groundwater or treated water, as the wear rate will be less compared to seawater.

SUMMARY

An aspect relates to a system for converting kinetic power to hydraulic power, where seawater is used as a secondary liquid while maintaining a lower wear rate of the system compared to a system using only seawater.

It is an aspect of embodiments of the invention to provide a system for converting kinetic power to hydraulic power, where water such as fresh water or groundwater or treated water is used as a secondary liquid.

It is an aspect of embodiments of the invention to provide a system for converting kinetic power to hydraulic power, where hydraulic oil is used as a secondary liquid.

An aspect of embodiments of the invention is achieved by a system for converting kinetic power to hydraulic power. In embodiments, the system comprises a piston housing and a piston displaceable within the piston housing, the piston comprising a piston shaft extending outside the piston housing for activation of the piston, and the piston divides the piston housing into a first chamber and a second chamber, and a first pressure tank and/or a second pressure tank, where the first and/or second pressure tanks comprising a flexible membrane separating the first and/or second pressure tank into a primary side and a secondary side, wherein the first chamber and/or second chamber being hydraulically connected, respectively, to the primary side of the first and/or second pressure tank. The secondary side of the first pressure tank and/or the second pressure tank being in liquid connection to an inlet valve for intake of liquid and in liquid connection with an outlet valve. In embodiments, the system further comprises a first liquid on the primary side and a different secondary liquid on the secondary side, wherein the secondary liquid is seawater or water or fresh water or groundwater or treated water or hydraulic oil.

By separating the system using the flexible membrane it is achieved that seawater is not introduced into the piston housing and the piston, and instead a primary liquid is inside the piston housing. The quality of the primary liquid can be controlled and thus be chosen such that the wear rate is reduced compared to a system using only seawater. In embodiments, the system still provides hydraulic power inform of a hydraulic seawater flow.

Actuation of the piston shaft will cause a pressure increase in the first chamber, or the second chamber and the pressure will reduce in the other chamber. A pressure increase will be transferred through the flexible membrane and seawater will be forced out through the outlet valve. A pressure decrease will likewise be transferred through the flexible membrane causing the system to take in seawater through the inlet valve. During normal operation the first chamber and second chamber will alternate between being at a higher pressure and at a lower pressure. In embodiments, the system is a seawater pump with one or two outlets.

In embodiments, the system may have only one pressure tank, however this would result in a lower hydraulic power output, thus in most cases the system will include both the first pressure tank and the second pressure tank.

In principle, the piston shaft can be activated by a lot of different solutions including wave activated solutions such as but not limited to the solution described shown in EP2864628. However, the piston shaft could also be driven by a conventional motor.

Thus, the output of embodiments of the system is hydraulic seawater which can be used directly.

Seawater will have a high wear rate when used for driving a water turbine since the water turbine has components moving at high velocities. The particles of the seawater will collide with the moving components at high relative speeds and the components will thus be worn over time. In embodiments, if the system is connected to a water turbine, it would then be desirable if the hydraulic liquid is water such as fresh water or groundwater or treated water as the wear rate will be less compared to seawater. Treated water may be water having oxygen and nitrates removed from the water to prevent growth inside the system. Other components may be removed from the treated water.

The secondary liquid may be hydraulic oil. However, in embodiments the system will be placed in a liquid environment and the use of hydraulic oil could pollute the liquid environment in case of a leak while leaking water or leaking seawater, on the contrary, will not pollute.

In an aspect, the first pressure tank or the second pressure tank may be positioned inside the first chamber or the second chamber of the piston housing. This will for a single piston create a more compact piston design as the pressure tank is part of the piston.

The chamber without a pressure tank can be connected to another pressure tank external to the piston. Thereby, a hybrid system is created wherein all movements of the piston will create a positive hydraulic output. However, in some embodiments only the chamber with the pressure tank will provide a hydraulic output.

In an aspect, the piston shaft may be positioned inside the first chamber or the second chamber opposite from the chamber comprising the first pressure tank or the second pressure tank. Thereby, the shaft can be displaced freely without having to be in a tight connection with the membrane such that the first liquid and the second liquid does not mix.

In an aspect, embodiments of the system may further comprise a second piston housing and a second piston displaceable within the second piston housing out of phase to the piston in the piston housing. The second piston comprises a second piston shaft extending outside the second piston housing for activation of the second piston, and the second piston divides the second piston housing into a first chamber and a second chamber. The second piston will in most embodiments be identical to the piston, although there may be minor differences. The piston can also be referred to as the first piston. The first and second pistons will together provide hydraulic output when the shafts are actuated, and because the pistons are out of phase the output will be substantially continuous.

In an aspect, the second pressure tank or the first pressure tank may be positioned inside the first chamber or the second chamber of the second piston housing. Thereby, both pressure tanks are positioned within either the first or second piston housing.

In an aspect, the second piston shaft is positioned inside the first chamber or the second chamber opposite from the chamber comprising the second pressure tank or the first pressure tank. Thereby, the second piston shaft can be displaced freely without having to be in a tight connection with the membrane such that the first liquid and the second liquid does not mix.

In an aspect, embodiments of the system may comprise an arm for connection with a wave-activated unit and a transmission system coupling the arm to
the piston housing or the piston shaft; and/or
the second piston housing or second piston shaft.

The transmission system may be a crank as shown in FIG. 4, however the transmission system could be another type of transmission system.

It does not matter whether the piston inside the piston housing moves due to a force applied by the transmission system to the piston housing or the piston shaft, as the resulting force is substantially the same. Thus, both embodiments work. The embodiment shown in FIG. 4 show a crank working on the piston housings but the crank could also be connected to the piston shafts.

In an embodiment, the secondary liquid (L2) is water such as fresh water or groundwater or treated water. In embodiments, the system may further comprise a system housing adapted for isolating the system i.e. the piston housing(s) from seawater. The transmission unit can be a crank extending from an external side to the system housing and into an internal side comprising the piston housings.

In an aspect, the flexible membrane of the first pressure tank and/or a second pressure tank may be a bladder membrane or a diaphragm membrane.

An embodiment with the bladder membrane is shown in FIG. 1 and an embodiment with the diaphragm membrane is shown in FIG. 2.

In an aspect, embodiments of the system may comprise a filter upstream to the liquid inlet.

The purpose of the filter is to prevent larger particles and/or objects from entering embodiments of the system as this would cause clogging.

The filter will however not be able to prevent introduction of the previously mentioned particles, which cause a high wear from entering embodiments of the system.

In an aspect, the first liquid may be a hydraulic oil.

Hydraulic oils are well known and thus it will be possible to choose a suitable hydraulic oil which can be used for the purpose. Furthermore, the hydraulic oil will reduce wear significantly relative to seawater.

In an aspect, the flexible membrane of the first pressure tank and/or the second pressure tank may be made of rubber or synthetic rubber such as nitrile rubber or EPDM rubber.

Any synthetic rubber material having the desired properties for a flexible membrane i.e. the desired properties related to chemical resistance, ductility, hardness.

In an aspect, the outlet valve may be connected to a hydro turbine. Thereby, embodiments of the system may generate electric energy using seawater as the secondary hydraulic liquid while keeping wear on the system as low as possible.

The output of the system is hydraulic seawater which can be used directly to generate electric power.

In an aspect, the outlet valve may be connected to at least one forward osmosis membrane or at least one reverse osmosis membrane or a desalination system. Thereby, embodiments of the system may generate drinkable water using seawater as the hydraulic liquid while keeping wear on the system as low as possible.

The output of the system is hydraulic seawater which can be used directly to generate clean water.

In an aspect, embodiments of the system may be positioned below a seawater surface. Thereby, embodiments of the system is positioned in the secondary liquid and thus have an unending supply without utilizing additional pumps or the like.

In an aspect, the piston shaft or piston housing may be wave activated. Thereby, embodiments of the system can be used to convert wave power into hydraulic power. The conversion will happen as long as the piston moves relatively inside the piston housing irrespective of whether it is the piston shaft or the piston housing which is activated.

The second piston shaft or the second piston housing may also wave activated for the same reasons.

The piston may be activated by the solution described in EP2864628 or by other wave power systems.

In an aspect, the inlet valves and/or the outlet valves may be non-return valves or check valves. Thereby, the seawater flow is controlled passively which will reduce risk of failures.

In an aspect, embodiments of the system may comprise a controller configured to open/close the inlet valves and the outlet valves as a function of piston position.

Thereby, embodiments of the system has a higher control of the flow going in and out of the system.

BRIEF DESCRIPTION

Some of the embodiments will be described in detail, with references to the following Figures, wherein like designations denote like members, wherein:

FIG. 3A illustrates an embodiment of the system where the piston is placed in a first position and the pressure tank is mounted within a piston housing;

FIG. 3B illustrates the system of FIG. 3A where the piston is placed in a second position;

FIG. 3C illustrates the system of FIGS. 3A and 3B where the piston is placed in a third position;

LIST OF REFERENCE NUMBERS

| Item | Reference |
| --- | --- |
| System | 1 |
| System housing | 10 |
| Top system part | 11 |
| External side | 12 |
| Internal side | 13 |
| Arm | 14 |
| Transmission system | 17 |
| Piston Housing | 21 |
| Piston | 26 |
| Piston shaft | 27 |
| First chamber | 28 |
| Second Chamber | 29 |
| Second piston housing | 212 |
| Second piston | 262 |
| Second piston shaft | 272 |
| First pressure tank - Diaphragm | 311 |
| Second Pressure tank - Diaphragm | 312 |
| First Pressure tank - Bladder | 321 |
| Second Pressure tank - Bladder | 322 |
| Flexible Membrane - Diaphragm | 341 |
| Flexible Membrane - Bladder | 342 |
| Primary side | 37 |
| Secondary side | 38 |
| Inlet Valve | 41, 42 |
| Outlet Valve | 51, 52 |
| First Liquid - primary side | L1 |
| Second Liquid - secondary side | L2 |

DETAILED DESCRIPTION

Figure 1A:
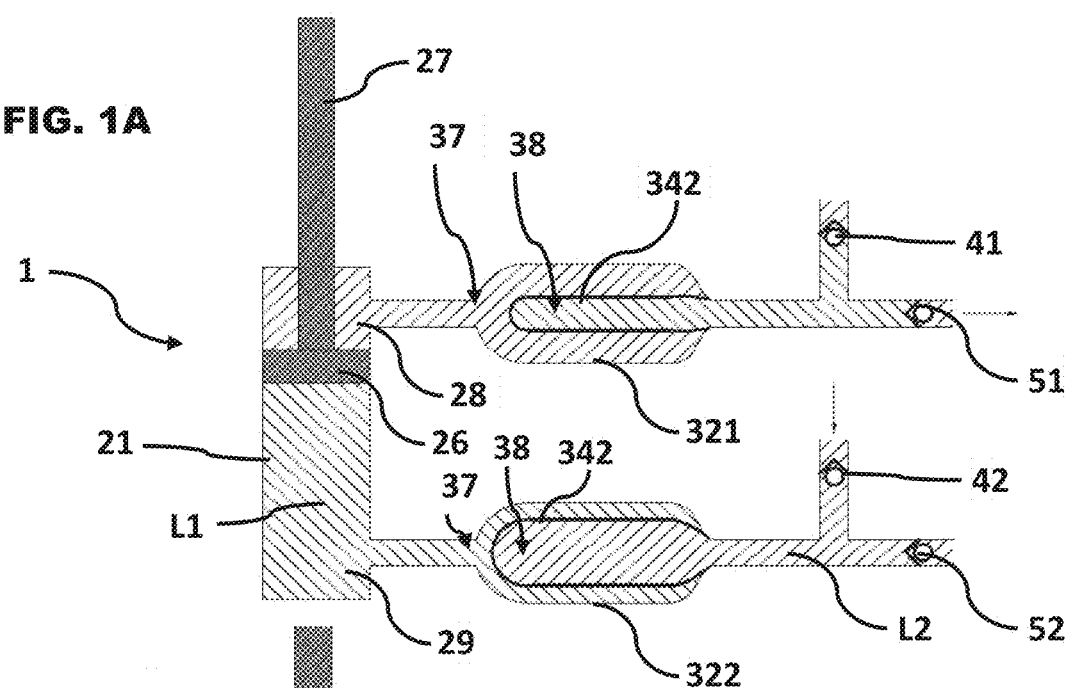
FIG. 1A illustrates an embodiment of the system where the piston is placed in a first position and mounted with a first and second pressure tank, and with a balloon membrane.
Figure 1B:
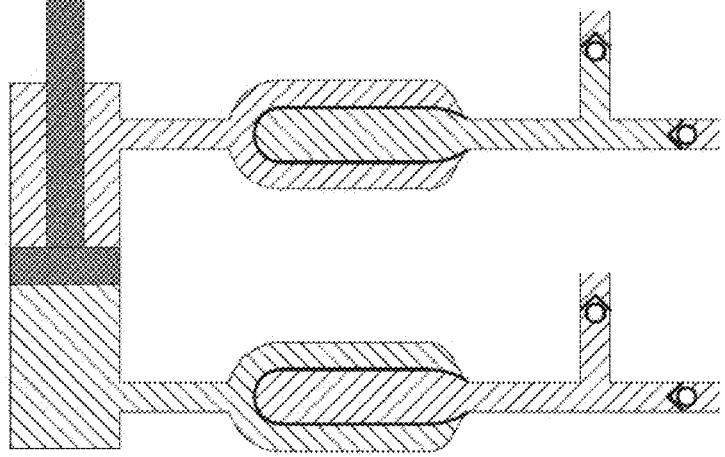
FIG. 1B illustrates the system of FIG. 1A where the piston is placed in a second position.
Figure 1C:
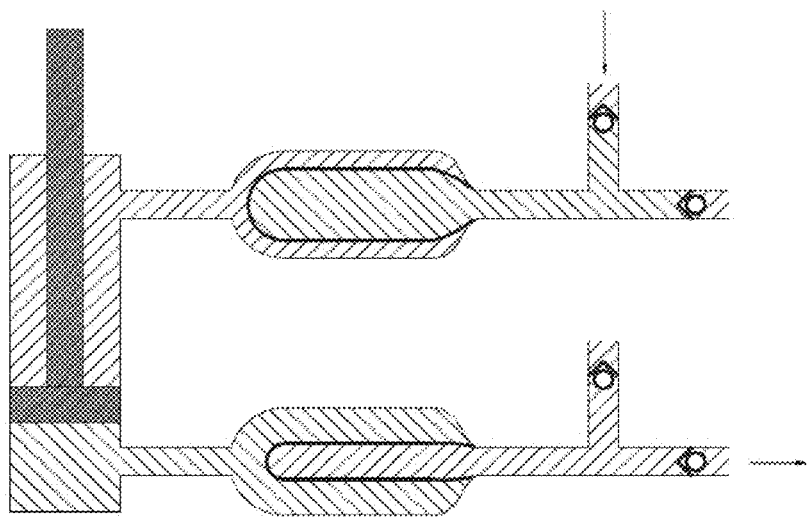
FIG. 1C illustrates the system of FIGS. 1A and 1B where the piston is placed in a third position.

FIGS. 1A-C illustrates an embodiment of a system 1 according to embodiments of the invention, where kinetic power is converted to hydraulic power.

In embodiments, the system 1 comprises a piston housing 21 and a piston 26 displaceable within the piston housing 21. In FIGS. 1A to 1C the piston 26 is at three different positions. The reference signs are only shown on FIG. 1A.

The piston 26 comprises a piston shaft 27 extending outside the piston housing 21 for activation of the piston 26. The piston shaft 27 may be wave-activated by a wave power system.

The piston 26 divides the piston housing 21 into a first chamber 28 and a second chamber 29. The displacement of the piston 26 will cause a pressure change in the first chamber 28 and the second chamber 29.

In embodiments, the system 1 further comprises a first pressure tank 321 and a second pressure tank 322. The first and the second pressure tanks 321,322 each comprises a flexible membrane 342 separating the first and the second pressure tank 321,322 into a primary side 37 and a secondary side 38.

In this embodiment the flexible membrane 342 is a bladder membrane 342.

The first chamber 28 is hydraulically connected to the primary side 37 of the first pressure tank 321 and the second chamber 29 is hydraulically connected to the primary side 37 of the second pressure tank 322.

The secondary side 38 of the first pressure tank 321 is in liquid connection to an inlet valve 41 for intake of liquid and in liquid connection with an outlet valve 51.

The secondary side 38 of the second pressure tank 322 is in liquid connection to an inlet valve 42 for intake of liquid and in liquid connection with an outlet valve 52.

The inlet valves 41, 42 may be check valves and the outlet valves 51, 52 may be check valves.

In embodiments, the system 1 further comprises a first liquid L1 on the primary side 37 and a different secondary liquid on the secondary side 38, wherein the secondary liquid L2 is seawater or water or fresh water or groundwater or treated water or hydraulic oil.

The actuation of the piston shaft 27 will cause the piston 26 to move from position shown in FIG. 1A and to FIG. 1B to FIG. 1C and back again. This will cause the bladder membranes 342 to expand and contract out of phase such that when the bladder membrane 342 in the first pressure tank 321 is contracting and forcing seawater out of the outlet 51, then the bladder membrane 342 in the second pressure tank 322 is expanding, sucking seawater through the inlet valve 42. This will reverse in the position shown in FIG. 1C.

Figure 2A:
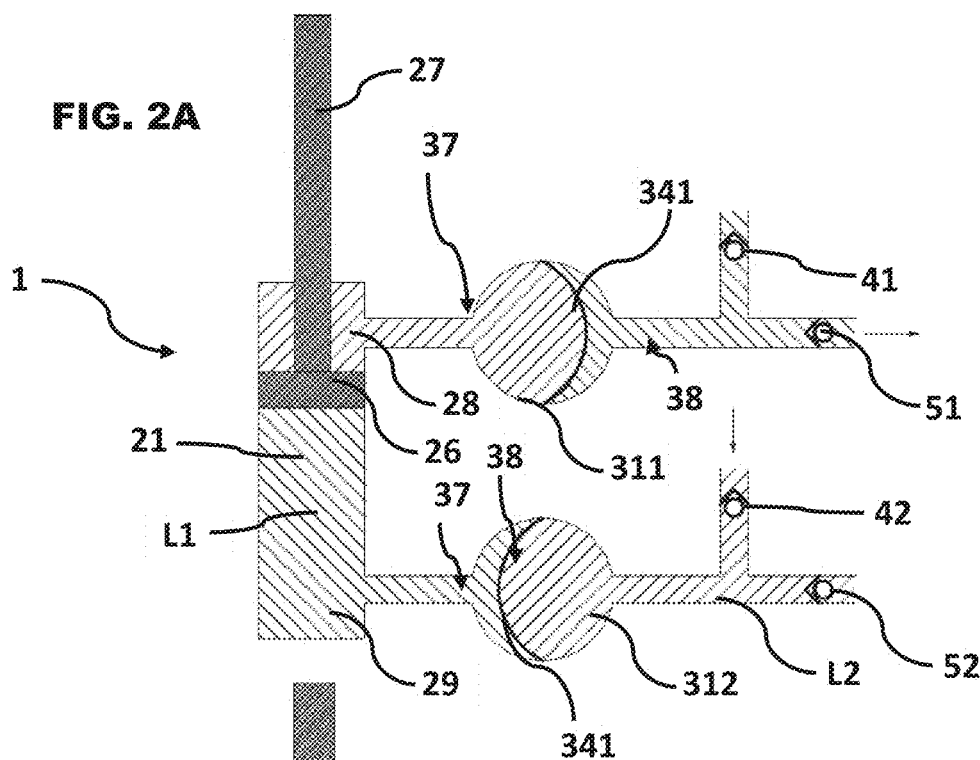
FIG. 2A illustrates an embodiment of the system where the piston is placed in a first position and mounted with a first and second pressure tank, and with a diaphragm membrane.
Figure 2B:
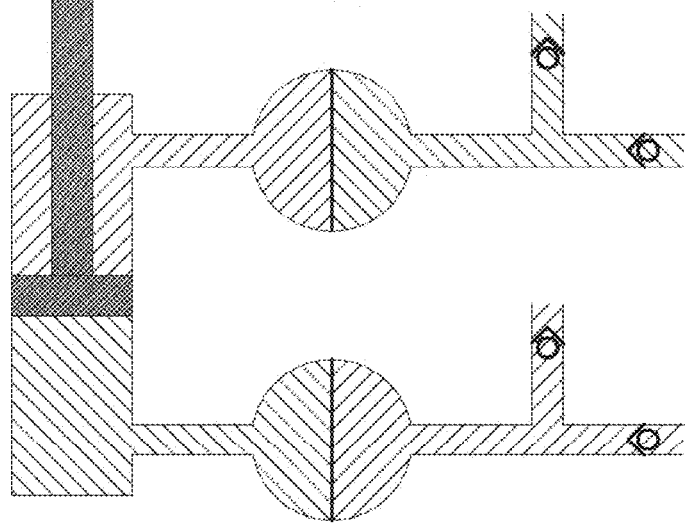
FIG. 2B illustrates the system of FIG. 2A where the piston is placed in a second position.
Figure 2C:
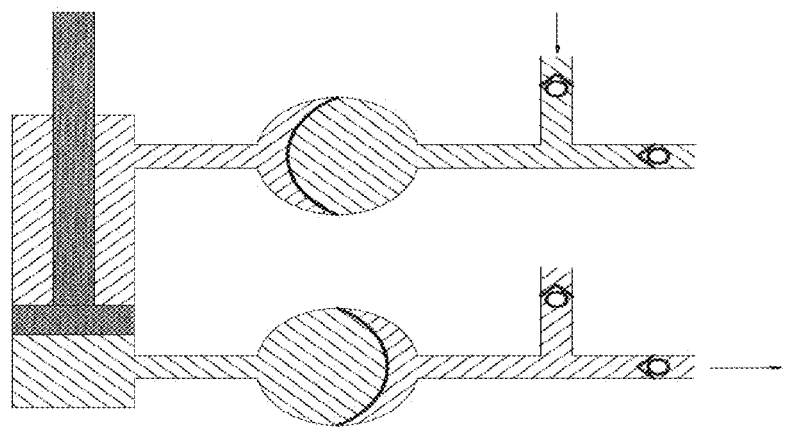
FIG. 2C illustrates the system of FIGS. 2A and 2B where the piston is placed in a third position.

FIGS. 2A-C illustrates an embodiment of a system 1 according to embodiments of the invention, where kinetic power is converted to hydraulic power.

In embodiments, the system 1 comprises a piston housing 21 and a piston 26 displaceable within the piston housing 21. In FIGS. 2A to 2C the piston 26 is at three different positions. The reference signs are only shown on FIG. 2A.

The piston 26 comprises a piston shaft 27 extending outside the piston housing 21 for activation of the piston 26. The piston shaft 27 may be wave-activated by a wave power system.

The piston 26 divides the piston housing 21 into a first chamber 28 and a second chamber 29. The displacement of the piston 26 will cause a pressure change in the first chamber 28 and the second chamber 29.

In embodiments, the system 1 further comprises a first pressure tank 311 and a second pressure tank 312. The first and the second pressure tanks 311,312 each comprises a flexible membrane 342 separating the first and the second pressure tank 311,312 into a primary side 37 and a secondary side 38.

In this embodiment the flexible membrane 341 is a diaphragm membrane 341.

The first chamber 28 is hydraulically connected to the primary side 37 of the first pressure tank 311 and the second chamber 29 is hydraulically connected to the primary side 37 of the second pressure tank 312.

The secondary side 38 of the first pressure tank 311 is in liquid connection to an inlet valve 41 for intake of liquid and in liquid connection with an outlet valve 51.

The secondary side 38 of the second pressure tank 312 is in liquid connection to an inlet valve 42 for intake of liquid and in liquid connection with an outlet valve 52.

The inlet valves 41,42 may be check valves and the outlet valves 51, 52 may be check valves.

In embodiments, the system 1 further comprises a first liquid L1 on the primary side 37 and a different secondary liquid on the secondary side 38, wherein the secondary liquid L2 is seawater or water or fresh water or groundwater or treated water or hydraulic oil.

The actuation of the piston shaft 27 will cause the piston 26 to move from position shown in FIG. 2A and to FIG. 2B to FIG. 2C and back again. This will cause the diaphragm membrane 341 to move out of phase such that when the diaphragm membrane 341 in the first pressure tank 311 is moving away from the piston housing 21 thereby forcing seawater out of the outlet 51, then the diaphragm membrane 341 in the second pressure tank 312 is moving towards the piston housing 21, thereby sucking seawater or water or fresh water or groundwater or treated water or hydraulic oil through the inlet valve 42. This will reverse the position shown in FIG. 2C.

FIGS. 3A-C illustrates an embodiment of a system 1 according to embodiments of the invention, where kinetic power is converted to hydraulic power.

In embodiments, the system 1 comprising a piston housing 21, 212 and a piston 26, 261 displaceable within the piston housing 212, the piston comprises a piston shaft 272 extending outside the piston housing 212 for activation of the piston 262, and the piston 262 divides the piston housing 212 into a first chamber 28 and a second chamber 29.

The second chamber 29 forms a pressure tank 311,321, wherein the first pressure tank 311,321 comprises a flexible membrane 341,342 separating the first and/or second pressure tank into a primary side 37 and a secondary side 38. The second chamber 29 being hydraulically connected to the primary side 37 of the first pressure tank 311,321.

The secondary side 38 of the pressure tank 311,321 is in liquid connection to an inlet valve 41,42 for intake of liquid and in liquid connection with an outlet valve 51,52. In embodiments, the system 1 further comprises
a first liquid L1 on the primary side 37 and a different secondary liquid on the secondary side 38, wherein the secondary liquid L2 is seawater or water or fresh water or groundwater or treated water or hydraulic oil. In embodiments, the secondary liquid L2 is seawater or water or fresh water or groundwater or treated water. In further embodiments, the secondary liquid L2 is water or fresh water or groundwater or treated water. The treated water may have oxygen and nitrates removed for prevention of unwanted growth inside the system 1.

In general, hydraulic oils are unwanted as leaks may cause pollution since the system 1 will be positioned in seawater.

FIGS. 3A-C illustrates various positions.

In the embodiments wherein the secondary liquid L2 is water or fresh water or groundwater or treated water, the system 1 can be used for driving a water turbine with less wear compared to using seawater.

Figures 4A, 4B:
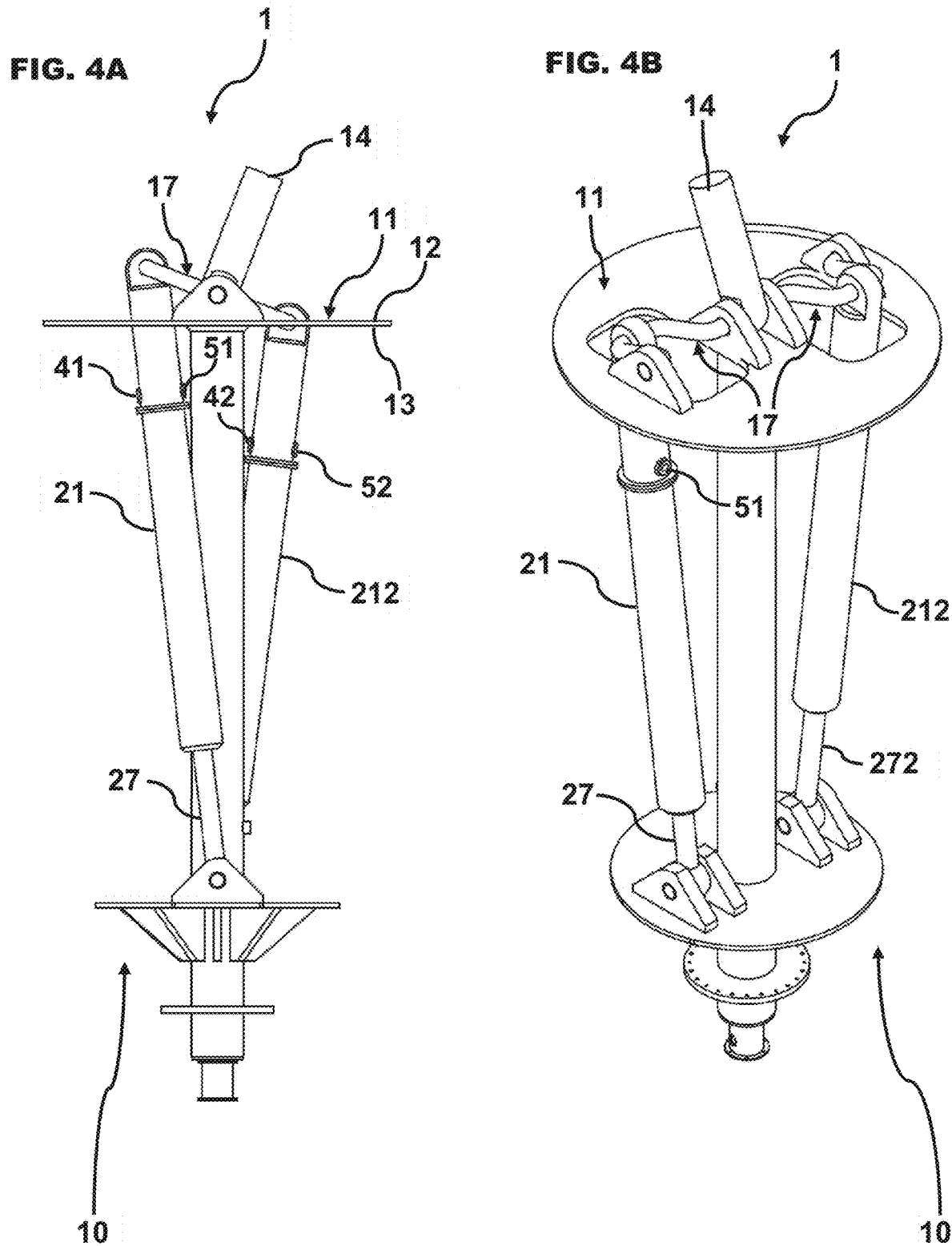
FIG. 4A illustrates a side view of an embodiment of the system actuating two pistons, wherein each piston functions as shown in FIGS. 3A-3B.
FIG. 4B illustrates a perspective side view of the embodiment of the system of FIG. 4A.

FIGS. 4A-B illustrates an embodiment of the system 1 actuating two pistons 21,212, wherein each piston 21,212 functions as shown in FIGS. 3A-C. The embodiment is shown from two different views. Thus, each piston housing 21, 212 and each shaft 27, 272 are similar or identical to the embodiment shown FIGS. 3A-C. In embodiments, the system housing 10 has an external side 11 with an arm 14 which is wave activated, however the flap or buoyant body connected to the arm 14 is not shown as it can have many different shapes and sizes without affecting the spirit of embodiments of the invention. The arm 14 will move back and forth and thereby cause the transmission system 17 which is a crank in the present embodiment, however other solutions are possible. The movement of the arm 14 will cause the transmission system 17 (crank) to move the piston housings 21, 212 up and down thereby causing the not shown pistons 26, 262 to move within the piston housings 21, 212 (see FIGS. 3A-C). Thereby, hydraulic power is created for use to drive a water turbine for example. The piston housings 21, 212 move 180 degrees out of phase to ensure a continuous hydraulic power.

In the embodiment, the piston housings 21, 212 are actuated by the transmission system 17 but the transmission system may in other embodiments actuate the piston shafts 27, 272 as the result will be the same.

The hydraulic liquid will enter through the inlets 41, 42 and exit through the outlets 51,52.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A system for converting kinetic power to hydraulic power, the system comprising:
 a piston housing and a piston displaceable within the piston housing, wherein the piston comprises a piston shaft extending outside the piston housing for activation of the piston, and the piston divides the piston housing into a first chamber and a second chamber, and
 a first pressure tank and/or a second pressure tank, wherein the first and/or second pressure tanks comprise a flexible membrane separating the first and/or second pressure tank into a primary side and a secondary side, wherein the first chamber and/or second chamber are hydraulicly connected, respectively, to the primary side of the first and/or second pressure tank, wherein the secondary side of the first pressure tank and/or the second pressure tank are in liquid connection to an inlet valve for intake of liquid and in liquid connection with an outlet valve,
 wherein the system further comprises
 a first liquid on the primary side and a different secondary liquid on the secondary side, wherein the secondary liquid is seawater or water or fresh water or groundwater or treated water or hydraulic oil,
wherein the first pressure tank or the second pressure tank is positioned inside the first chamber or the second chamber of the piston housing.

2. The system according to claim 1, wherein the piston shaft is positioned inside the first chamber or the second chamber opposite from the chamber comprising the first pressure tank or the second pressure tank.

3. The system according to claim 1, wherein the system further comprises a second piston housing and a second piston displaceable within the second piston housing out of phase to the piston in the piston housing, the second piston comprises a second piston shaft extending outside the second piston housing for activation of the second piston, and wherein the second piston divides the second piston housing into a first chamber and a second chamber.

4. The system according to claim 3, wherein the second pressure tank or the first pressure tank is positioned inside the first chamber or the second chamber of the second piston housing.

5. The system according to claim 4, wherein the second piston shaft is positioned inside the first chamber or the second chamber opposite from the chamber comprising the second pressure tank or the first pressure tank.

6. The system according to claim 1, wherein the system comprises an arm for connection with a wave-activated unit and a transmission system coupling the arm to
the piston housing or the piston shaft; and/or
the second piston housing or second piston shaft.

7. The system according to claim 1, wherein the flexible membrane of the first pressure tank and/or a second pressure tank is a bladder membrane or a diaphragm membrane.

8. The system according to claim 1, wherein the system comprises a filter upstream to the liquid inlet.

9. The system according to claim 1, wherein the first liquid is a hydraulic oil or water.

10. The system according to claim 1, wherein the flexible membrane of the first pressure tank and/or the second pressure tank is made of rubber or synthetic rubber such as nitrile rubber or EPDM rubber.

11. The system according to claim 1, wherein the outlet valve is connected to a hydro turbine.

12. The system according to claim 1, wherein the outlet valve is connected to at least one forward osmosis membrane or at least one reverse osmosis membrane or a desalination system.

13. The system according to claim 1, wherein the system is positioned below a seawater surface.

14. The system according to claim 1, wherein the piston shaft or piston housing is wave activated.

15. The system according to claim 1, wherein the inlet valves and/or the outlet valves are non-return valves or check valves.

16. The system according to claim 1, wherein the system comprises a controller configured to open/close the inlet valves and the outlet valves as a function of piston position.

* * * * *